United States Patent [19]
Hayashi et al.

[11] Patent Number: 6,002,382
[45] Date of Patent: Dec. 14, 1999

[54] PLASMA ADDRESSED DISPLAY

[75] Inventors: Masatake Hayashi; Atsushi Seki, both of Kanagawa, Japan

[73] Assignee: Sony Corporation, Tokyo, Japan

[21] Appl. No.: 08/932,044

[22] Filed: Sep. 17, 1997

[30] Foreign Application Priority Data

Sep. 19, 1996 [JP] Japan ................ P08-269313

[51] Int. Cl.⁶ ........................................ G09G 3/28
[52] U.S. Cl. ............................ 345/60; 315/169.4
[58] Field of Search ................... 345/60, 62, 67, 345/68; 313/484, 485, 584, 586; 349/143, 32, 58; 315/169.4

[56] References Cited

U.S. PATENT DOCUMENTS 5,408,245  4/1995  Kakizaki .................... 345/60

FOREIGN PATENT DOCUMENTS

| 0 326 254 | 8/1989 | European Pat. Off. . |
| 0 613 164 A1 | 8/1994 | European Pat. Off. . |
| 4-265931 | 9/1992 | Japan . |
| 5-297810 | 11/1993 | Japan . |

*Primary Examiner*—Richard A. Hjerpe
*Assistant Examiner*—Francis Nguyen
*Attorney, Agent, or Firm*—Hill & Simpson

[57] ABSTRACT

A plasma addressed display is intended to improve structures of electrodes and barrier ribs for stabilizing the discharge characteristics and enhancing the yield and the image quality. The plasma addressed display has a flat panel structure in which a display cell is laminated on a plasma cell. The plasma cell has discharge channels sequentially arranged along the scanning direction. The display cell is joined to the plasma cell, and it has signal electrodes sequentially arranged in the direction perpendicular to the scanning direction, and liquid crystal in contact with the signal electrodes. The plasma cell has a lower substrate joined to the display cell side, pairs of anode electrodes and cathode electrodes disposed in discharge channels, and barrier ribs formed on the substrate so as to partition the discharge channels from each other. The cathode electrode is positioned at an approximately central portion of one discharge channel partitioned by the two adjacent barrier ribs, and the corresponding anode electrode is brought in contact with one, positioned on the downstream side of the scanning direction, of the two adjacent barrier ribs.

5 Claims, 5 Drawing Sheets

PLASMA ADDRESSED DISPLAY

BACKGROUND OF THE INVENTION

1. Field of the Invention

The present invention relates to a plasma addressed display having a flat panel structure in which a display cell is laminated to a plasma cell, and particularly to structures of electrodes and barrier ribs in discharge channels formed in the plasma cell.

2. Description of the Related Art

A plasma addressed display having a plasma cell used for addressing a display cell has been disclosed, for example, in Japanese Patent Laid-open No. Hei 4-265931. As shown in FIG. 3, the plasma addressed display in this document has a flat panel structure including a display cell 1, a plasma cell 2, and a common intermediate substrate 3 interposed therebetween. The plasma cell 2 is composed of a lower substrate 8 joined to the intermediate substrate 3 with a specific gap put therebetween. An ionizable gas is sealed in the gap between the lower substrate 8 and the intermediate substrate 3. Anode electrodes 9A and cathode electrodes 9K, each of which are formed in a stripe shape, are alternately disposed on the inner surface of the lower substrate 8. These electrodes can be printed and sintered on the flat substrate 8 by screen printing, for example. Barrier ribs 10 are formed on the anode electrodes 9A, and they divide the gap, in which the ionizable gas is sealed, into discharge channels 12. Each cathode electrode 9K is positioned between the two adjacent ones of the barrier ribs 10. These barrier ribs 10 can be over-printed by screen printing. The top portions of the barrier ribs 10 are brought in contact with the bottom surface of the intermediate substrate 3. In some cases, the barrier ribs 10 may be formed by sand blasting. Specifically, an insulating material, which is previously formed on the lower substrate 8 to a thickness corresponding to the dimension of the gap, is etched through a mask by sand blasting, to be thus patterned into a stripe shape. The mask can be formed by photolithography. Such a sand blasting process allows the barrier ribs 10 to be patterned at a higher accuracy as compared with the screen printing process or the like. One discharge channel 12 contains one cathode electrode 9K and two anode electrodes 9A positioned on both sides of the cathode electrode 9K. A plasma is discharged between the cathode electrode 9K and the anode electrode 9A. The intermediate substrate 3 is joined to the lower substrate 8 with glass frit 11 or the like.

The display cell 1 is composed of a transparent upper substrate 4. The upper substrate 4 is stuck on the intermediate substrate 3 with a specific gap put therebetween using a sealing material 6 or the like. The gap between the upper substrate 4 and the intermediate substrate 3 is filled with an electro-optic material such as liquid crystal 7. Signal electrodes 5 are formed on the inner surface of the upper substrate 4. These signal electrodes 5 are perpendicular to the stripe shaped discharge channels 12. Pixels are arranged in a matrix at portions where the signal electrodes 5 cross the discharge channels 12.

The plasma addressed display having such a configuration is driven by scanning rows of the discharge channels 12 for performing plasma discharge in such a manner as to switch the discharge channels 12 in line-sequence, and applying image signals to columns of the signal electrodes 5 on the display cell 1 side in synchronization with the scanning of the discharge channels 12. When plasma discharge is generated in each discharge channel 12, the interior of the discharge channel 12 comes to be at a nearly equal anode potential, so that pixels for each row are selected. In other words, the discharge channel 12 functions as a sampling switch. When an image signal is applied to each pixel in such a state that the plasma sampling switch is conductive, sampling is performed. The lighting on or off of the pixels can be thus controlled. Even after the plasma sampling switch is turned into the non-conductive state, the image signals are held in the pixels as they are.

FIG. 4 is a typical perspective view showing structures of electrodes and barrier ribs formed on the lower substrate 8 shown in FIG. 3. The anode electrodes 9A and the cathode electrodes 9K, each of which are patterned in a stripe shape, are alternately arranged. These electrodes can be formed by screen printing or sand blasting. The barrier ribs 10 are formed on the anode electrodes 9A. The width of the barrier rib 10 is narrower than that of the anode electrode 9A. The barrier ribs 10 can be also formed by screen printing or sand blasting.

FIG. 5 is a typical sectional view showing another example of the related art plasma addressed display. Parts corresponding to those shown in FIG. 3 are indicated by the same reference numerals for an easy understanding. In this related art example, a pair of an anode electrode 9A and a cathode electrode 9K are formed in each discharge channel 12. Differently from the related art example shown in FIG. 3, a barrier rib 10 is provided not on the anode electrode 9A but directly on the surface of the lower substrate 8.

In the related art shown in FIG. 3, since the anode electrode 9A is formed on the underside of the barrier rib 10, the width of the anode electrode 9A can be made relatively larger. This brings an advantage that the electric resistance of the anode electrode 9A can be made smaller. Since the cathode electrode 9K is positioned at an approximately central portion of the discharge channel 12, the possible positional offset of the barrier rib 10 does not exert a large adverse effect on the discharge characteristics of the discharge channel 12. This brings an advantage that it is not required to strictly specify the relative positional accuracy between the electrode and the barrier rib. However, since the barrier rib 10 is formed on the anode electrode 9A, there possibly occurs a problem that the bonding strength therebetween is poor. In particular, in the case of forming the barrier ribs 10 by sand blasting, there is a fear that the barrier ribs 10 are peeled from the anode electrodes 9A due to a stress such as a wind pressure applied during the sand blasting step.

On the contrary, in the related art shown in FIG. 5, since the barrier ribs 10 are formed on the surface of the lower substrate 8, the bonding strength is superior to that in the related art example shown in FIG. 3. However, since the cathode electrode 9K is disposed at a position offset from the center of the discharge channel 12, an electric field distribution applied to the cathode electrode 9K tends to be affected by the barrier ribs 10 on both the sides, resulting in uneven plasma discharge. In general, the cathode electrode 9K is easily affected by the electric field distribution as compared with the anode electrode 9A. In the related art example shown in FIG. 5, the cathode electrode 9K is essentially offset from the center of the discharge channel 12, and accordingly, when the barrier rib 10 is offset, there is a tendency to generate uneven plasma discharge. In other words, in the related art example shown in FIG. 5, the discharge characteristics of the discharge channel 12 are largely dependent on positional accuracies of the electrode and barrier rib, which has been a problem with production of the plasma addressed display. Moreover, in the case of AC driving of the plasma addressed display in which the polarity of a signal voltage applied to the liquid crystal 7 is reversed for each row, there is a fear that the signal voltage is not sufficiently applied to the liquid crystal 7 at a position near the barrier rib 10. In the related art example shown in FIG. 5, when back light is impinged from the plasma cell 2 side and an image is observed on the display cell 1 side, there occurs light leakage near the barrier rib 10, causing a problem in reducing the display contrast. In general, the plasma addressed display is observed substantially at a frontal viewing angle. In the related art example shown in FIG. 5, if light coming through gaps between the barrier rib 10, the anode electrode 9A, and the cathode electrode 9K is not sufficiently controlled by the liquid crystal 7, the display contrast is reduced.

SUMMARY OF THE INVENTION

An object of the present invention is to provide a plasma addressed display capable of improving structures of electrodes and barrier ribs, thereby stabilizing plasma discharge characteristics of the display and enhancing the yield and the image quality thereof.

To achieve the above object, according to the present invention, there is provided a plasma addressed display including: a plasma cell having a plurality of discharge channels sequentially arranged along the scanning direction of the display; and a display cell joined to the plasma cell, the display cell having signal electrodes sequentially arranged in the direction perpendicular to the scanning direction and an electro-optic material layer in contact with the signal electrodes; wherein the plasma cell has a substrate opposite to the display cell and the plurality of discharge channels, each of the discharge channels having at least one pair of an anode electrode and a cathode electrode formed on the substrate, the discharge channels also having a plurality of barrier ribs formed on the substrate in such a manner as to partition the discharge channels from each other; the cathode electrode is disposed at an approximately central portion in one of the discharge channels partitioned by two of the barrier ribs adjacent to each other; and the anode electrode corresponding to the cathode electrode is disposed in the one discharge channel at a position in contact with one of the two adjacent barrier ribs.

In the above plasma addressed display of the present invention, an ionizable gas is preferably sealed in the discharge channels; a width of the anode electrode is preferably larger than a width of the barrier rib; the anode electrode is preferably disposed in such a manner as to be brought in contact with one, positioned on the downstream side of the scanning direction of the display, of the two adjacent barrier ribs partitioning the one discharge channel; the barrier ribs are preferably formed by patterning an insulating material formed on the substrate into a stripe shape by sand blasting; the barrier ribs are preferably formed by laminating an insulating material by screen printing using a stripe shaped mask; and a side wall of the anode electrode is preferably brought in contact with the barrier rib.

According to the present invention, since the cathode electrode is positioned at an approximately central portion of the discharge channel, it is possible to stably generate plasma discharge without exerting a large effect on positional accuracies of the barrier ribs and the electrodes. Since the barrier ribs are directly formed on the surface of the substrate, the bonding strength of the barrier ribs is excellent. Accordingly, even when the barrier ribs are formed by sand blasting, they are not peeled due to a wind pressure of sand blasting during the processing step. Further, since the anode electrode is formed in such a manner as to be brought in contact with the barrier rib, the light leakage of the display cell at a position near the barrier rib is shielded with the anode electrode by suitable selection of the scanning direction of the plasma cell. As a result, it is possible to suppress reduction in contrast of the display cell observed at a frontal viewing angle.

BRIEF DESCRIPTION OF THE DRAWINGS

Other features and advantages of the invention will be apparent from the following description taken in conjunction with the accompanying drawings in which.

DETAILED DESCRIPTION OF THE PREFERRED EMBODIMENT

Figure 1:
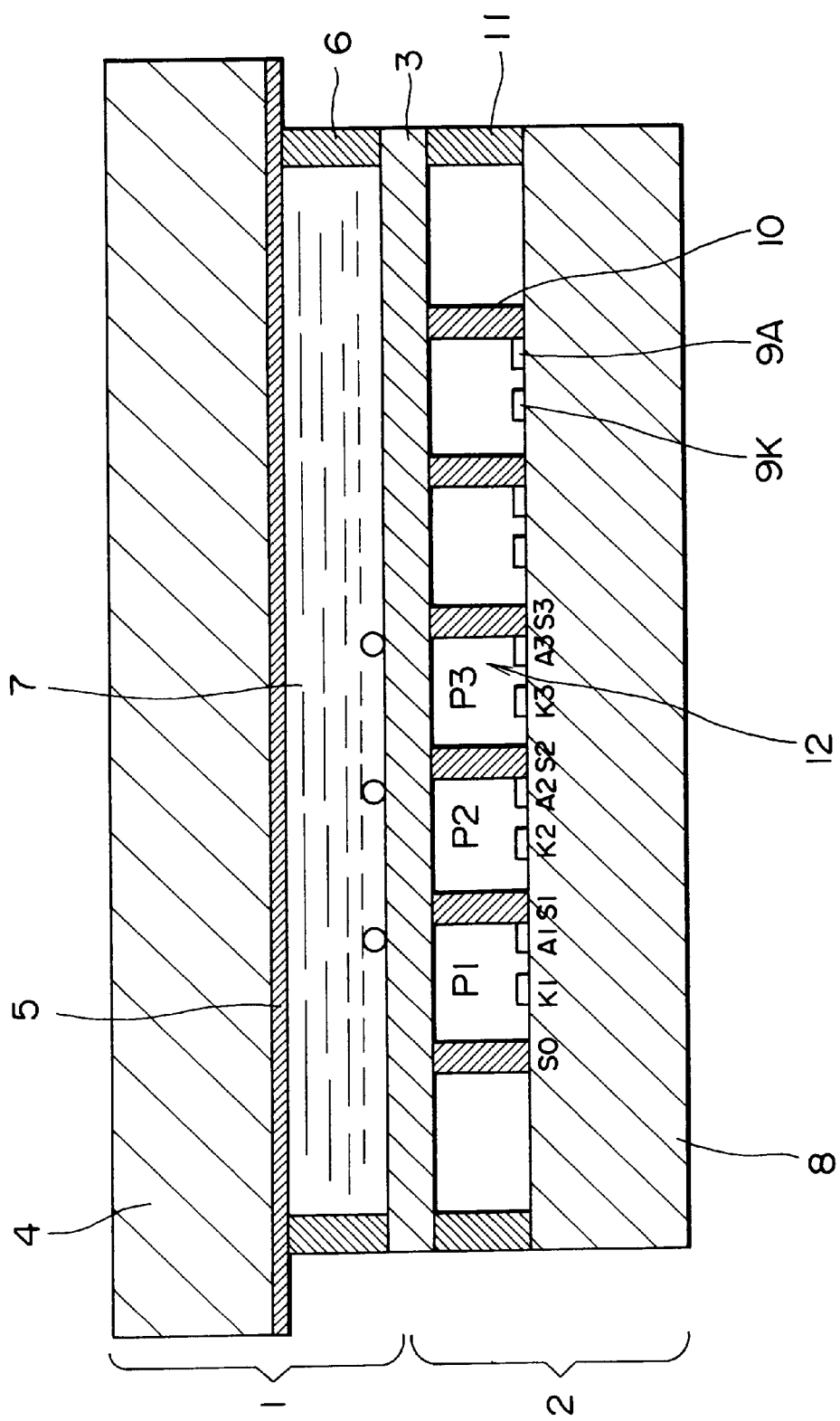
FIG. 1 is a sectional view of a plasma addressed display of the present invention.

Hereinafter, a preferred embodiment of the present invention will be described in detail with reference to the drawings. FIG. 1 is a typical sectional view showing a basic configuration of a plasma addressed display of the present invention. The plasma addressed display of the present invention has a flat panel structure in which a display cell 1 is laminated to a plasma cell 2. The plasma cell 2 has discharge channels 12 sequentially arranged along the scanning direction (from left to right in the drawing). The display cell 1 is joined to the plasma cell 2 through an intermediate substrate 3, and it has signal electrodes 5 sequentially arranged in the direction perpendicular to the scanning direction (in the direction perpendicular to the paper plane) and an electro-optic material layer such as liquid crystal 7 in contact with the signal electrodes 5. Specifically, the signal electrodes 5 are formed in a stripe shape on the inner surface of an upper substrate 4. The upper substrate 4 is joined to the intermediate substrate 3 through a sealing material 6. On the other hand, the plasma cell 2 is composed of a lower substrate 8 which is joined by means of glass frit 11 or the like to the intermediate substrate 3 with a specific gap put therebetween. Pairs of cathode electrodes 9K and anode electrodes 9A, and barrier ribs 10 are provided on the lower substrate 8. Each pair of the cathode electrode 9K and the anode electrode 9A are formed in one of the discharge channels 12, and the barrier ribs 10 are formed in such a manner as to partition the discharge channels 12 from each other. As the feature of the present invention, the cathode electrode 9K is positioned at an approximately central portion in one discharge channel 12 partitioned from both the sides by the two barrier ribs 10 adjacent to each other; and the corresponding anode electrode 9A is disposed in the discharge channel 12 in such a manner as to be brought in contact with one of the two adjacent barrier ribs 10. The barrier ribs 10 are directly formed on the surface of the lower substrate 8. With this configuration, even if a relative positional error occurs between the electrodes and the barrier rib, it does not exert adverse effect on plasma discharge generated in the discharge channel 12. Specifically, since the cathode electrode 9K is positioned at an approximately central portion of the discharge channel 12, there is no fear that the barrier rib 10 is overlapped on the surface of the cathode electrode 9K, and thereby an effective electrode area of the cathode electrode 9K can be kept unchanged. Also, since the cathode electrode 9K is positioned at an approximately central portion of the discharge channel 12, the electric field on the surface of the cathode electrode 9K is not affected by the surroundings so much. Besides, the anode electrode 9A can sufficiently effect stable plasma discharge, provided that only part of the surface of the anode electrode 9A is exposed. Accordingly, if the barrier rib 10 is offset and is partially overlapped on the anode electrode 9A, the partial overlapping little exerts adverse effect on plasma discharge, with a result that there is no fear of occurrence of uneven plasma discharge.

Next, the operation of the plasma addressed display of the present invention will be described with reference to FIG. 1. Here, for an easy understanding, three pieces of the discharge channels 12 arranged from upstream to downstream of the scanning direction are indicated by characters P1, P2 and P3; three pairs of the cathode electrodes 9K and the anode electrodes 9A contained in the discharge channels P1, P2 and P3 are indicated by characters K1/A1, K2/A2 and K3/A3, respectively; and the barrier ribs 10 arranged from upstream to downstream of the scanning direction are indicated by characters S0, S1, S2 and S3. In addition, each anode electrode 9A is brought in contact with one, positioned on the downstream side of the scanning direction, of the two barrier ribs 10 partitioning one discharge channel 12 from both the sides. For example, while the discharge channel P1 is partitioned from both the side by the two barrier ribs S0 and S1, the anode electrode A1 is brought in contact with the barrier rib S1 positioned on the downstream side of the scanning direction. The discharge channels 12 are scanned sequentially from the discharge channel P1, and a signal voltage is sequentially applied to the signal electrodes 5 in synchronization with the scanning of the discharge channels 12. In general, for the display cell 1 using the liquid crystal 7 as the electro-optic material layer, a so-called line reverse driving is carried out by reversing the polarity of the signal voltage for each of the discharge channels 12 constituting the scanning lines. For example, when the discharge channel P1 performs plasma discharge, a signal voltage having a positive polarity is applied to the signal electrodes 5, and when the plasma channel P2 next performs plasma discharge, a signal voltage having a negative polarity is applied to the signal electrodes 5. In such a line reverse driving, there occur portions to which it is difficult to apply a signal voltage, as shown by circular marks. Specifically, the portion shown by the circular mark is brought in contact with a region of the liquid crystal 7 in which directly after a signal voltage having one polarity is written in, a signal voltage having the opposed polarity is written in. As a result, at the portion shown by the circular mark, the signal voltage previously written in tends to be canceled by the effect of the signal voltage subsequently written in. According to the present invention, even in such a case, since the portion shown by the circular mark is masked by the anode electrode 9A, it is possible to prevent reduction in display contrast at the frontal viewing angle.

Figure 2:
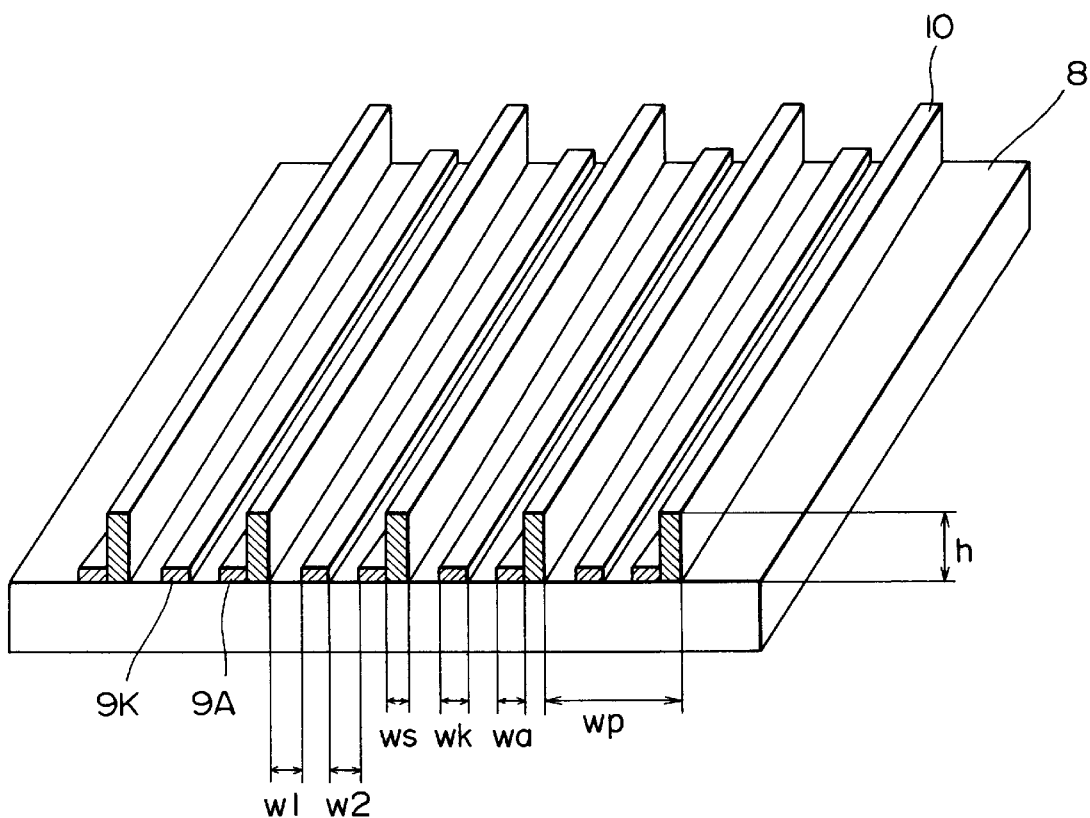
FIG. 2 is a typical perspective view showing structures of electrodes and barrier ribs formed on a lower substrate assembled in the plasma addressed display shown in FIG. 1.
Figure 3:
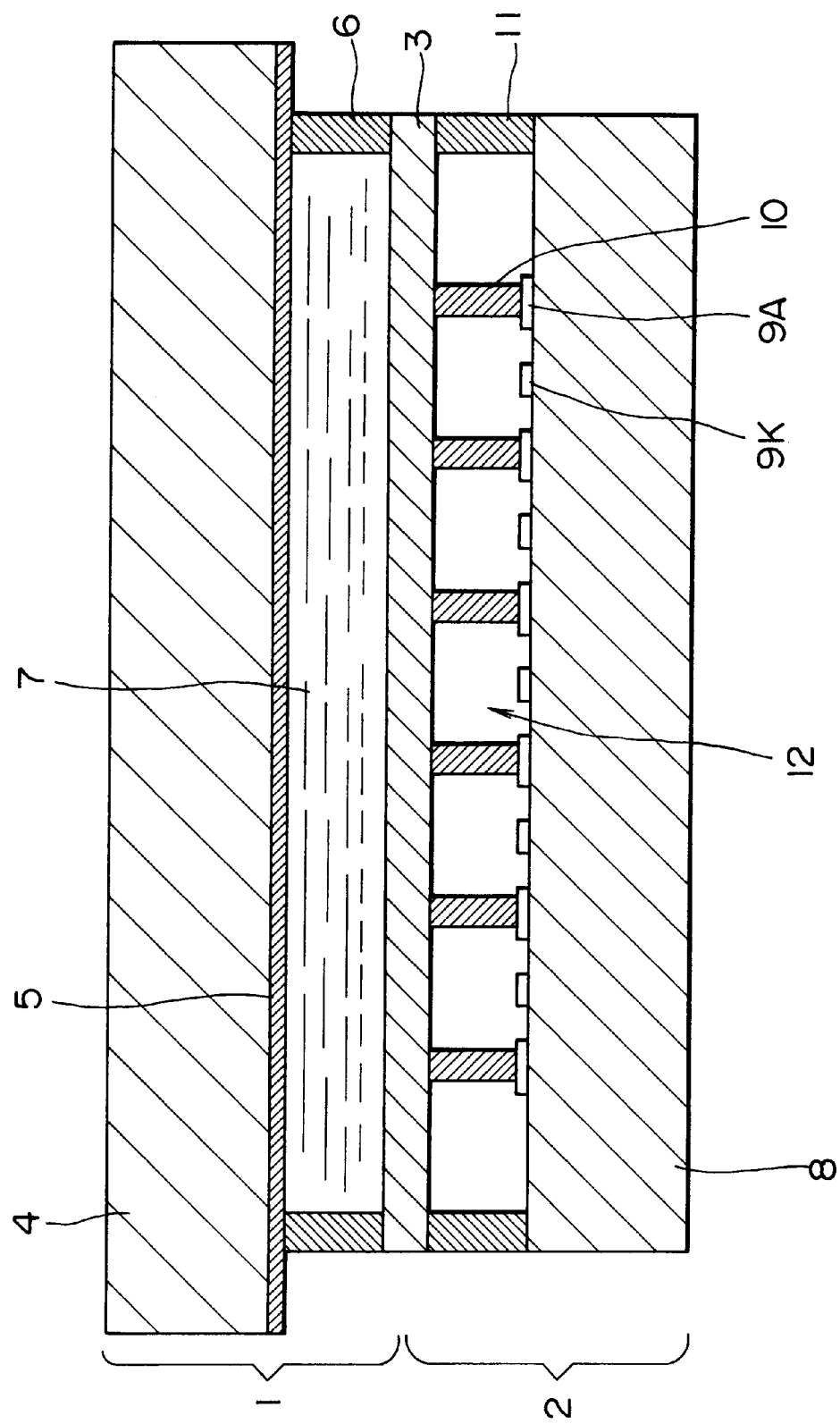
FIG. 3 is a sectional view showing one example of a related art plasma addressed display.
Figure 4:
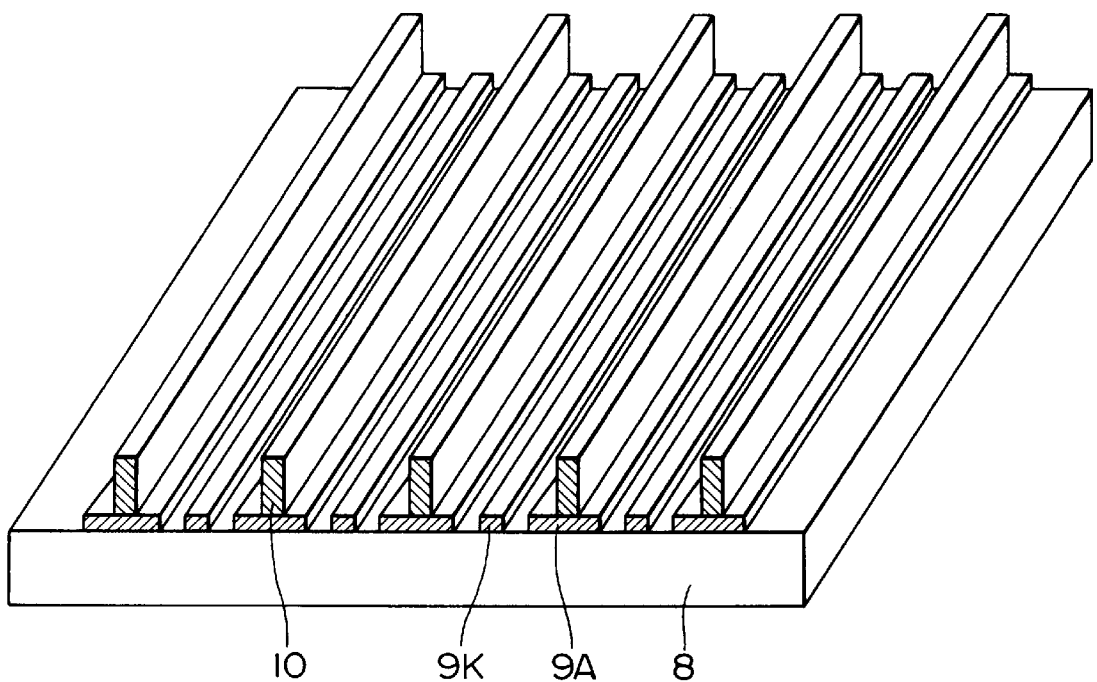
FIG. 4 is a perspective view showing structures of electrodes and barrier ribs formed on a lower substrate assembled in the related art plasma addressed display shown in FIG. 3.
Figure 5:
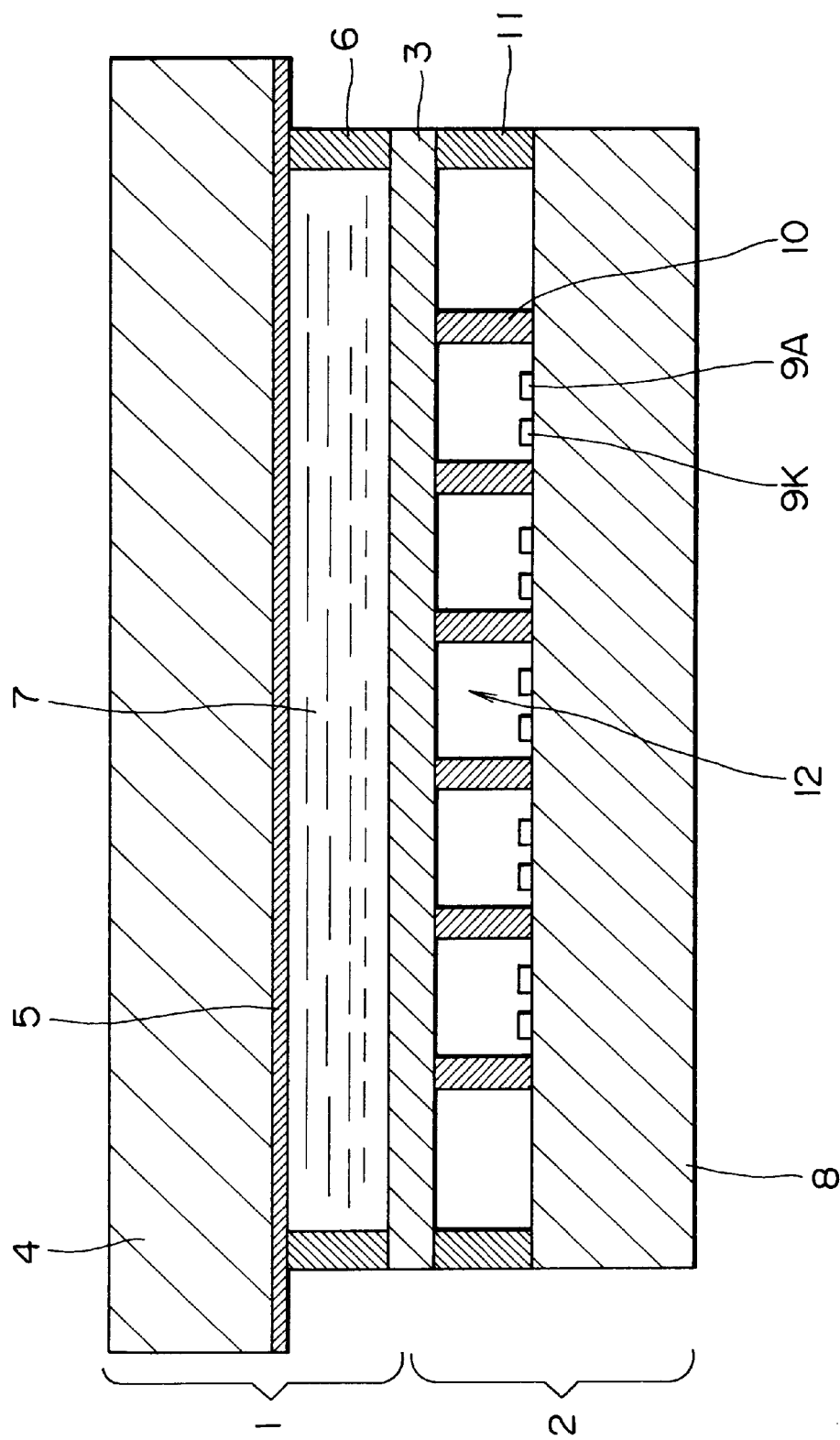
FIG. 5 is a sectional view showing another example of the related art plasma addressed display.

FIG. 2 is a typical perspective view showing structures of electrodes and barrier ribs formed on the lower substrate 8 side shown in FIG. 1. As shown in this figure, the anode electrodes 9A and the cathode electrodes 9K, each of which are patterned in a stripe shape, are alternately arranged. The cathode electrode 9K is positioned at an approximately central portion between the two adjacent barrier ribs 10, and the anode electrode 9A is brought in contact with one of the two adjacent barrier ribs 10. The barrier ribs 10 are directly formed on the surface of the substrate 8. In the example shown in FIG. 2, a width wa of the anode electrode 9A is set at 100 μm while a width wk of the cathode electrode 9K is set at 100 μm, and a width ws of the barrier rib 10 is similarly set at 100 μm. A gap w1 between the barrier rib 10 and cathode electrode 9K is set at 200 82 m while a gap w2 between the cathode electrode 9K and the anode electrode 9A is also set at 200 μm. An arrangement pitch wp of the two adjacent barrier ribs 10 is thus 700 μm. In addition, a height h of the barrier rib 10 is set at 200 μm. With this configuration, even if there occurs a relative positional offset of 50 μm between the anode electrode 9A and barrier rib 10 which have been previously set to be brought in contact with each other, the anode electrode 9A is 50 μm exposed yet. As a result, such a positional offset between the anode electrode 9A and the barrier rib 10 little exerts adverse effect on plasma discharge. In this embodiment, the barrier ribs 10 are formed by patterning an insulating material formed on the substrate 8 to a thickness corresponding to the dimension of the gap of the plasma cell 2 (that is, the height h of the barrier rib 10) into a stripe shape by sand blasting. Specifically, an inorganic insulating material such as glass is formed to a thickness h, and the surface of the insulating film is coated with a photoresist. The photoresist is patterned into a stripe shape by photolithography. The insulating material is etched by sand blasting through the photoresist thus patterned, to form barrier ribs 10. In this case, the barrier ribs 10 are sufficiently bonded on the surface of the lower substrate 8 because the anode electrodes 9A are not provided on the underside of the barrier ribs 10. As a result, there is no fear that the barrier ribs 10 are peeled from the lower substrate 8 even if a wind pressure is applied thereto at the sand blasting step.

As described above, according to the present invention, a cathode electrode is positioned at an approximately central portion in one discharge channel partitioned from both the sides by two barrier ribs adjacent to each other, and the corresponding anode electrode is disposed in the one discharge channel in such a manner as to be brought in contact with one, positioned on the downstream side of the scanning direction, of the two adjacent barrier ribs. With this configuration, it is possible to make larger allowable ranges of positional accuracies of the electrodes and the barrier rib, and hence to eliminate the necessity of excessively broadening the width of each electrode. As a result, the occupied area of the electrodes in the discharge channel can be reduced, to increase the numerical aperture of the display, thereby improving the brightness and reducing the power consumption. Also, since the uniformity of plasma discharge is improved, the service life of the display is prolonged and the image quality is improved. Further, since there occurs no peeling between the barrier rib and the anode electrode, the sand blasting process excellent in both mass-productivity and accuracy can be used for forming the barrier ribs, leading to the improved productivity and yield of the displays. In addition, since the contrast of the display observed at the frontal viewing angle is improved, the image quality can be enhanced.

While the preferred embodiment of the present invention has been described using specific terms, such description is for illustrative purposes only, and it is understood that changes and variations may be made without departing from the spirit or scope of the following claims.

What is claimed is:

1. A plasma addressed display, comprising:

a plasma cell having a plurality of discharge channels sequentially arranged along a scanning direction of said plasma addressed display; and a display cell joined to said plasma cell, said display cell having signal electrodes sequentially arranged in the direction perpendicular to the scanning direction and an electro-optic material layer;

wherein said plasma cell has a substrate opposite to said display cell, pairs of anode electrodes and cathode electrodes formed on said substrate, each of said pairs extending along one of said discharge channels, a plurality of barrier ribs formed on said substrate in such a manner as to partition said discharge channels from each other;

each of said cathode electrodes being disposed at an approximately central portion in a corresponding one of said discharge channels partitioned by two of said barrier ribs adjacent to each other; and said anode electrodes being disposed in corresponding ones of said discharge channels at a position such that a side wall of each of said anode electrodes is in contact with a side wall of one of said two barrier ribs forming each of said discharge channels.

2. A plasma addressed display according to claim 1, wherein a width of said anode electrode is larger than a width of said barrier rib.

3. A plasma addressed display according to claim 1, wherein said anode electrodes are disposed such that the side wall of said anode electrodes is in contact with the side wall of said barrier ribs positioned on the downstream side of the scanning direction of said display.

4. A plasma addressed display according to claim 1, wherein said plurality of barrier ribs are formed by patterning an insulating material formed on said substrate into a stripe shape by sand blasting.

5. A plasma addressed display according to claim 1, wherein said barrier ribs are formed by laminating an insulating material by screen printing using a stripe shaped mask.

* * * * *